Jan. 20, 1925.  1,523,622
D. ALTMAN
BRAKE MECHANISM FOR VEHICLES
Filed March 16, 1923  2 Sheets-Sheet 1
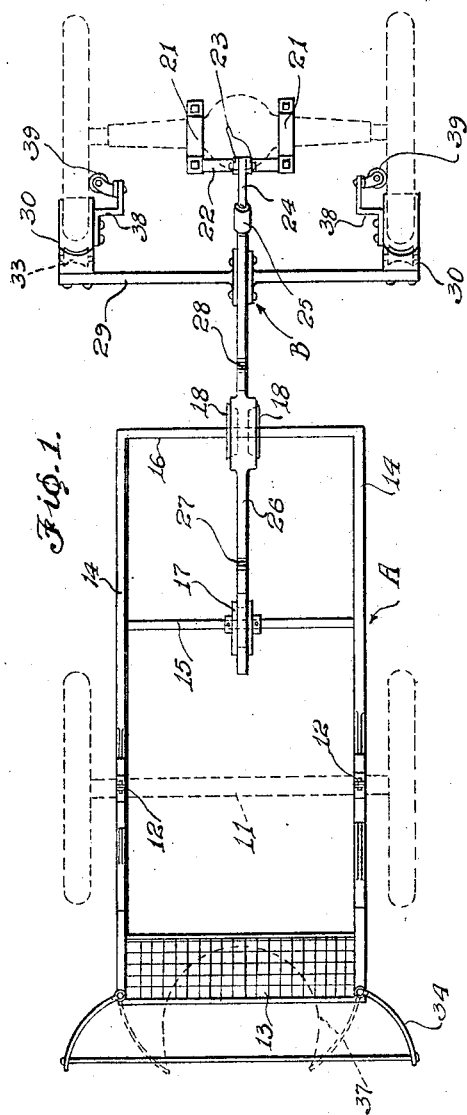
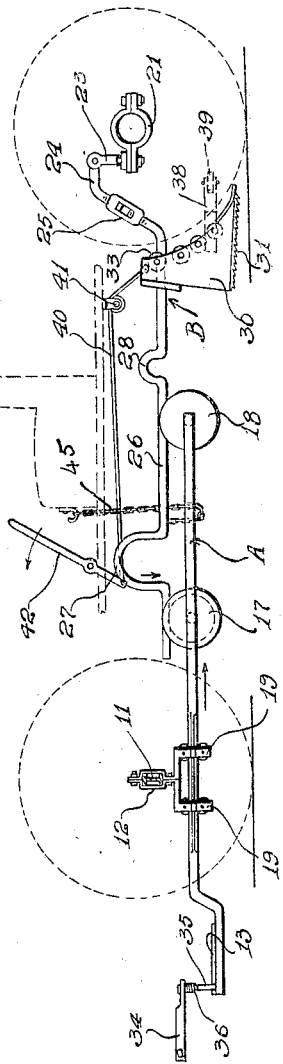
Inventor
David Altman
By J. Richard Paris
His Attorney Jan. 20, 1925.  
D. ALTMAN  
1,523,622  
BRAKE MECHANISM FOR VEHICLES  
Filed March 16, 1923  2 Sheets-Sheet 2

Inventor  
David Altman  
By I. Richard Paris.  
His Attorney

Patented Jan. 20, 1925.

1,523,622

UNITED STATES PATENT OFFICE.

DAVID ALTMAN, OF BALTIMORE, MARYLAND.

BRAKE MECHANISM FOR VEHICLES.

Application filed March 16, 1923. Serial No. 625,509.

*To all whom it may concern:*

Be it known that I, DAVID ALTMAN, a citizen of Poland, and resident of Baltimore, in the State of Maryland, have invented a new and useful Brake Mechanism for Vehicles, of which the following is a specification.

It is the object of this invention to provide a mechanism which will operate in the case of sudden danger, such as an obstruction in the roadway, or a person stepping in front of the vehicle when in motion, to apply a braking force to the wheels and stop the vehicle.

Figure 3:
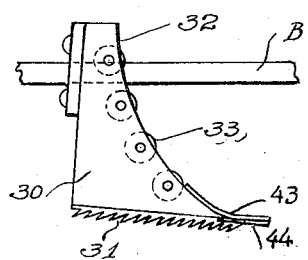
Figure 4:
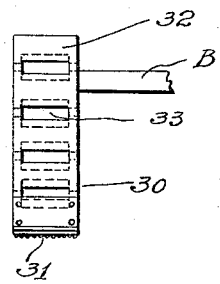
Figure 5:
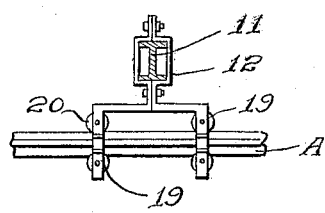
Figure 6:
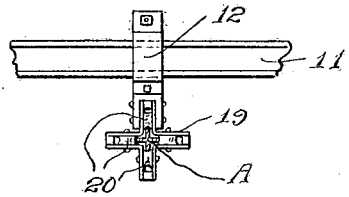
Figure 7:
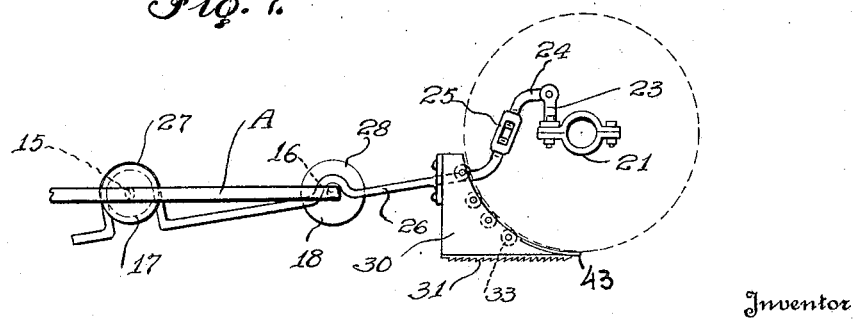

Referring to the drawings which form a part of this specification:

Fig. 1 is a plan view of the mechanism mounted on an automobile chassis, only parts of the chassis being shown in dotted lines. Fig. 2 is a side view of the same showing the brakes in their normal position. Figs. 3 and 4 show side and front views of the brake shoe. Figs. 5 and 6 show the means for suspending the fender and Fig. 7 shows the brake mechanism in its applied position.

The brake mechanism comprises two frameworks A and B. The framework A consists of a fender 13, two longitudinal rods 14, and two cross rods 15 and 16. The cross rod 15, which is nearer the fender has mounted at its center a freely rotatable grooved roller 17. The cross rod 16 has mounted at its center a split grooved roller 18, the two halves of the roller being spaced each from the other. At a point intermediate the cross rod 15 and the fender each longitudinal rod 14 passes through a pair of yokes 19 which have mounted therein the rollers 20. The entire frame work A is thereby adapted to slide through the said yokes. The upper ends 12 of the yokes 19 are so shaped that each pair may embrace the front axle 11 of the vehicle and be clamped each to the other and to the axle. When mounted the entire frame work A is suspended below the body of the car and is free to move longitudinally of the car.

The frame work B comprises a pair of clamping sleeves adapted to clamp the rear axle housing. The plate 22 connects the two sleeves 21 rigidly, and has mounted at its middle point a supporting rod 23. Pivot arm 24 is pivotally attached to the upper end of the supporting rod 23. A turnbuckle 25 is attached to the pivoted arm 24. The guide rod 26 is attached to the other end of the turnbuckle. The guide rod is disposed to ride freely on the rollers 17 and 18. The guide rod 26 is provided with one long goose neck bend 27 adapted to fit over the roller 17, and a small goose neck 28 adapted to fit over cross rod 16. The portion of the guide rod 26 that normally rides over the split roller 18 is wide enough to bridge the space between the halves of the roller and ride on the roller.

Attached to the guide rod 26 at a point intermediate the turnbuckle 25 and the goose neck 28 is the cross plate 29. The plate 29 extends across the entire width of the car. At the ends of the plate are attached the brake shoes 30.

The brake shoes 30 are of the shape shown and are provided with teeth 31 on the face which rests on the ground when the brakes are applied. The teeth point forwardly. The curved face 32 of the brake shoe has rollers 33 mounted therein.

The brake shoes have fixed on their operative tips strips 43 of leather or other flexible friction material. The strips are backed by leaf springs 44 in order to give the leather a certain degree of stiffness.

In order to prevent any appreciable side play of the frame work B and the brakes, brackets 38 holding universally mounted rollers 39 are attached to the inner faces of the brake shoes. The bracket is so disposed that the rollers 39 ride freely and lightly on the inner peripheral face of the wheel or tire.

If desired a chain 40 which rides over pulley 41 may be attached to the brake shoe and to the lower end of the gear shift lever.

If desired a device which will encircle and hold any person who may step in front of the vehicle while in motion may be attached to the fender. The device comprises a pair of arms 34, hinged to the corners of the fender by means of the torsion spring hinge 35, 36 and a chain 37 connecting the free ends of the arms. When a person strikes the chain 37, the arms 34 assume the dotted position and encircle him.

The operation of the device becomes obvious from the structured description. If the vehicle strikes an obstruction the framework A will slide backwards in the guides 19, until the roller 17 reaches a point below gooseneck 27. At this point the split roller will have reached the gooseneck 28. The guide rod 26 will drop to the position indicated in Fig. 7. The brake shoes will drop with the guide rod. The wheels of the vehicle will be drawn up on the braking face of the brake shoe by the aid of the leather strip 43. This will cause the teeth or serrations 31 to become embedded in the paving of the road. The braking of this shoe is effected either by the braking effect on the periphery of the wheel or by the braking effect on the ground by the serrations 31 or by both. As the brake shoes drop from the normal position to the applied position, they exert a pull on the chain 40 which shifts the gear lever to the neutral position.

If desired a chain 45 may be attached to the guide rod 26 and brought within reach of the operator. When desired the chain 45 may be drawn up taut. The result will be that the entire mechanism is made inoperative.

Having thus described my invention, I claim:

1. A brake mechanism for road vehicles comprising two structurally independent units, one of said units comprising a longitudinally movable frame, and the other of said units comprising a pair of brake shoes, means for pivotally supporting said brake shoes on the rear axle housing of said vehicle, and a member fixed to said brake shoes and disposed in sliding contact with and supported by a member of the first mentioned unit, whereby the brakes are normally maintained in their inoperative position.

2. The structure recited in claim 1, in which one of the last mentioned members is provided with a depression to receive the other member when the said frame has moved a predetermined distance, whereby the brakes are placed in to operative position.

3. A brake mechanism for road vehicles comprising a pair of brake shoes, a frame for supporting same pivotally attached to the rear axle housing, a guide rod projecting forwardly, and a longitudinally movable mechanism for holding said brake shoes in its normal position.

4. A brake mechanism for road vehicles comprising a pair of brake shoes, a frame supporting said brake shoes pivotally attached to the rear axle housing of the vehicle a guide rod projecting forwardly of said frame, longitudinally movable means for permitting the operation of the brakes and manually operable means to prevent the operation of the brakes.

5. A brake mechanism for road vehicles comprising a brake shoe having a wheel contacting face and a ground contacting face, the ground contacting face being serrated, and a strip of friction material on the wheel contacting face and a resilient metallic strip attached to the under face of the said strip of friction material.

6. A brake mechanism for road vehicles comprising a brake shoe having a wheel contacting face and a ground contacting face, the ground contacting face being serrated, a strip of friction material on the wheel contacting face having a free end projecting beyond the tip of said shoe a resilient metallic strip attached to the under face of the said free end and means for causing said brake to drop by its own gravity and to cause the free end of the friction material to be engaged by the rotating wheel.

In testimony whereof I hereunto affix my signature.

DAVID ALTMAN.